(12) United States Patent
Yang et al.

(10) Patent No.: US 9,122,938 B2
(45) Date of Patent: Sep. 1, 2015

(54) APPARATUS AND METHOD FOR OFFSETTING TRANSMISSION LEAKAGE SIGNAL OF RFID READER USING INJECTION LOCKED OSCILLATOR (ILO)

(71) Applicant: ELECTRONICS AND TELECOMMUNICATIONS RESEARCH INSTITUTE, Daejeon (KR)

(72) Inventors: Hoe Sung Yang, Daejeon (KR); Sang Hyun Mo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/508,015

(22) Filed: Oct. 7, 2014

(65) Prior Publication Data

US 2015/0097031 A1    Apr. 9, 2015

(30) Foreign Application Priority Data

Oct. 7, 2013   (KR) ........................ 10-2013-0119026

(51) Int. Cl.
   *G06K 7/00*   (2006.01)
   *G06K 7/10*   (2006.01)
(52) U.S. Cl.
   CPC .................................. *G06K 7/10198* (2013.01)
(58) Field of Classification Search
   USPC ................. 235/451, 492; 455/67.14; 340/10.1
   See application file for complete search history.

(56) References Cited

U.S. PATENT DOCUMENTS

| 6,121,847 A | * | 9/2000 | Katznelson et al. | 331/44 |
| 2007/0194886 A1 | * | 8/2007 | Bang et al. | 340/10.1 |
| 2008/0041953 A1 | * | 2/2008 | Frederick et al. | 235/451 |
| 2009/0068957 A1 | * | 3/2009 | Koo et al. | 455/67.14 |
| 2010/0026460 A1 | * | 2/2010 | Lee et al. | 340/10.1 |
| 2011/0163762 A1 | * | 7/2011 | Marchetti et al. | 324/615 |
| 2014/0219141 A1 | * | 8/2014 | Niskanen et al. | 370/278 |

FOREIGN PATENT DOCUMENTS

| KR | 1020010071305 A | 7/2001 |
| KR | 1020080096176 A | 10/2008 |
| KR | 1020100018346 A | 2/2010 |
| KR | 1020110129746 A | 12/2011 |
| KR | 1020120018543 A | 3/2012 |

* cited by examiner

Primary Examiner — Tuyen K Vo
(74) Attorney, Agent, or Firm — Ladas & Parry LLP

(57) ABSTRACT

A transmission leakage signal offset apparatus of a radio frequency identification (RFID) reader is disclosed. The transmission leakage signal offset apparatus may include a signal divider to divide a received signal of the RFID reader, the received signal including a transmission leakage signal, and to transmit the divided received signal to a signal combiner and an injection locked oscillator (ILO); a signal synchronizer to synchronize a phase of the ILO with a phase of the transmission leakage signal; a phase controller to control a phase difference between the received signal of the RFID reader and an output signal of the ILO; and a signal combiner to combine the received signal of the RFID reader and the output signal of the ILO, between which the phase difference is controlled.

20 Claims, 8 Drawing Sheets

APPARATUS AND METHOD FOR OFFSETTING TRANSMISSION LEAKAGE SIGNAL OF RFID READER USING INJECTION LOCKED OSCILLATOR (ILO)

CROSS-REFERENCE TO RELATED APPLICATION

This application claims the benefit of Korean Patent Application No. 10-2013-0119026, filed on Oct. 7, 2013, in the Korean Intellectual Property Office, the disclosure of which is incorporated herein by reference.

BACKGROUND

1. Field of the Invention

A following description relates to an apparatus and method for offsetting a transmission leakage signal of a radio frequency identification (RFID) reader, and more particularly, to an apparatus and method for offsetting a transmission leakage signal of an RFID reader, the apparatus and method which offset the transmission leakage signal by applying the transmission leakage signal of the RFID reader to an injection lock oscillator (ILO).

2. Description of the Related Art

In regard to a transmission signal of a conventional radio frequency identification (RFID) reader, a transmission leakage signal transmitted from a transmitter of the RFID reader flows into a receiver of the RFID reader.

The transmission leakage signal flown into the receiver reduces reception sensitivity of the RFID reader. Generally in RFID communication, a tag operates by an extremely low power and a power level of an RF signal received from the tag is extremely low. However, a power level of the transmission leakage signal flowing from the transmitter to the receiver of the RFID reader is relatively higher than a power level of a received power from the tag. The transmission leakage signal becomes a main factor that reduces a signal to noise ratio (SNR) of the receiver of the RFID reader.

According to a generally used method to solve the SNR reduction, amplitude and a phase of the transmission leakage signal are measured and a signal having an opposite phase and equal amplitude are generated to combine with and offset the transmission leakage signal. However, in the RFID reader, the amplitude and the phase of the transmission leakage signal are not constant but often changed due to external circumstances of an antenna connected with the RFID reader.

Accordingly, there is a demand for a separate device for measuring amplitude and a phase of a transmission leakage signal, which are changeable, and an additional control device for changing the amplitude and phase according to the measured values.

SUMMARY

An aspect of the present invention provides an apparatus and method of offsetting a transmission leakage signal which offset a transmission leakage signal of a radio frequency identification (RFID) reader without an additional control device by removing the transmission leakage signal through a structural improvement of a transmitter and a receiver of the RFID reader.

Another aspect of the present invention provides an apparatus and method of offsetting a transmission leakage signal, which synchronize the phase with the transmission leakage signal by using the transmission leakage signal as an input signal of an injection lock oscillator (ILO) and control amplitude of the ILO by a bias voltage or current of the ILO, thereby efficiently simplifying a conventional structure for measuring amplitude and a phase of an RFID reader.

According to an aspect of the present invention, there is provided a transmission leakage signal offset apparatus of a radio frequency identification (RFID) reader including a signal divider to divide a received signal of the RFID reader, the received signal including a transmission leakage signal, and to transmit the divided received signal to a signal combiner and an injection locked oscillator (ILO), a signal synchronizer to synchronize a phase of the ILO with a phase of the transmission leakage signal, a phase controller to control a phase difference between the received signal of the RFID reader and an output signal of the ILO, and a signal combiner to combine the received signal of the RFID reader and the output signal of the ILO, between which the phase difference is controlled.

According to another aspect of the present invention, there is provided a transmission leakage signal offset method of an RFID reader, the transmission leakage signal offset method including dividing a received signal of the RFID reader, the received signal including a transmission leakage signal, and transmitting the divided received signal to a signal combiner and an ILO, synchronizing a phase of the ILO with a phase of the transmission leakage signal, controlling a phase difference between the received signal of the RFID reader and an output signal of the ILO, and combining the received signal of the RFID reader and the output signal of the ILO, between which the phase difference is controlled.

EFFECT

According to embodiments of the present invention, an apparatus and method of offsetting a transmission leakage signal offset a transmission leakage signal of a radio frequency identification (RFID) reader without an additional control device by removing the transmission leakage signal through a structural improvement of a transmitter and a receiver of the RFID reader.

Additionally, according to embodiments of the present invention, an apparatus and method of offsetting a transmission leakage signal synchronize the phase with the transmission leakage signal by using the transmission leakage signal as an input signal of an injection lock oscillator (ILO) and control amplitude of the ILO by a bias voltage or current of the ILO, thereby efficiently simplifying a conventional structure for measuring amplitude and a phase of an RFID reader.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
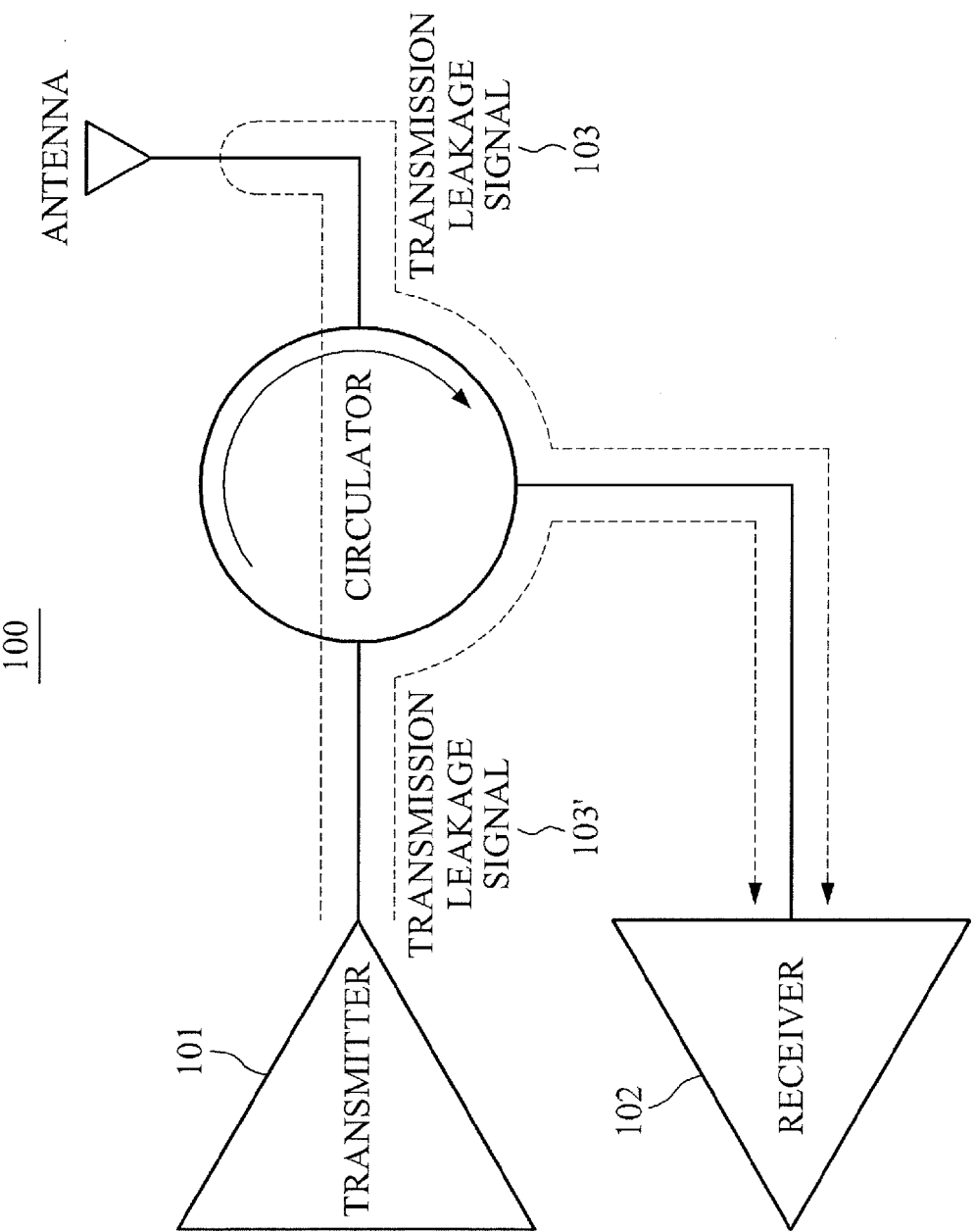
FIG. 1 is a diagram illustrating a transmission leakage signal according to an embodiment of the present invention.

Reference will now be made in detail to exemplary embodiments of the present invention, examples of which are illustrated in the accompanying drawings, wherein like reference numerals refer to the like elements throughout.

FIG. 1 is a diagram illustrating a transmission leakage signal according to an embodiment of the present invention.

Referring to FIG. 1, a radio frequency identification (RFID) reader 100 includes a transmitter 101 and a receiver 102. The transmitter 101 may transmit a signal of the RFID reader 100. The signal may include a transmission leakage signal 103' transmitted from the transmitter 101 and received by the receiver 102 through a circulator, and a transmission leakage signal 103 transmitted from the transmitter 101, passed through the circulator, reflected by an antenna, and received by the receiver 102. Here, amplitude and a phase of the transmission leakage signals 103 and 103' may be not constant but changed due to external circumstances of the antenna connected with the RFID reader 100.

The receiver 102 may receive an input of the transmission leakage signals 103 and 103' leaked from the transmitter 101 and a tag signal received from a tag. The transmission leakage signals 103 and 103' and the tag signal may be combined with each other. A power level of the tag signal may be relatively lower than a power level of the transmission leakage signals 103 and 103'. The transmission leakage signals 103 and 103' leaked due to the external circumstances of the antenna may have a relatively higher power level.

Figure 2:
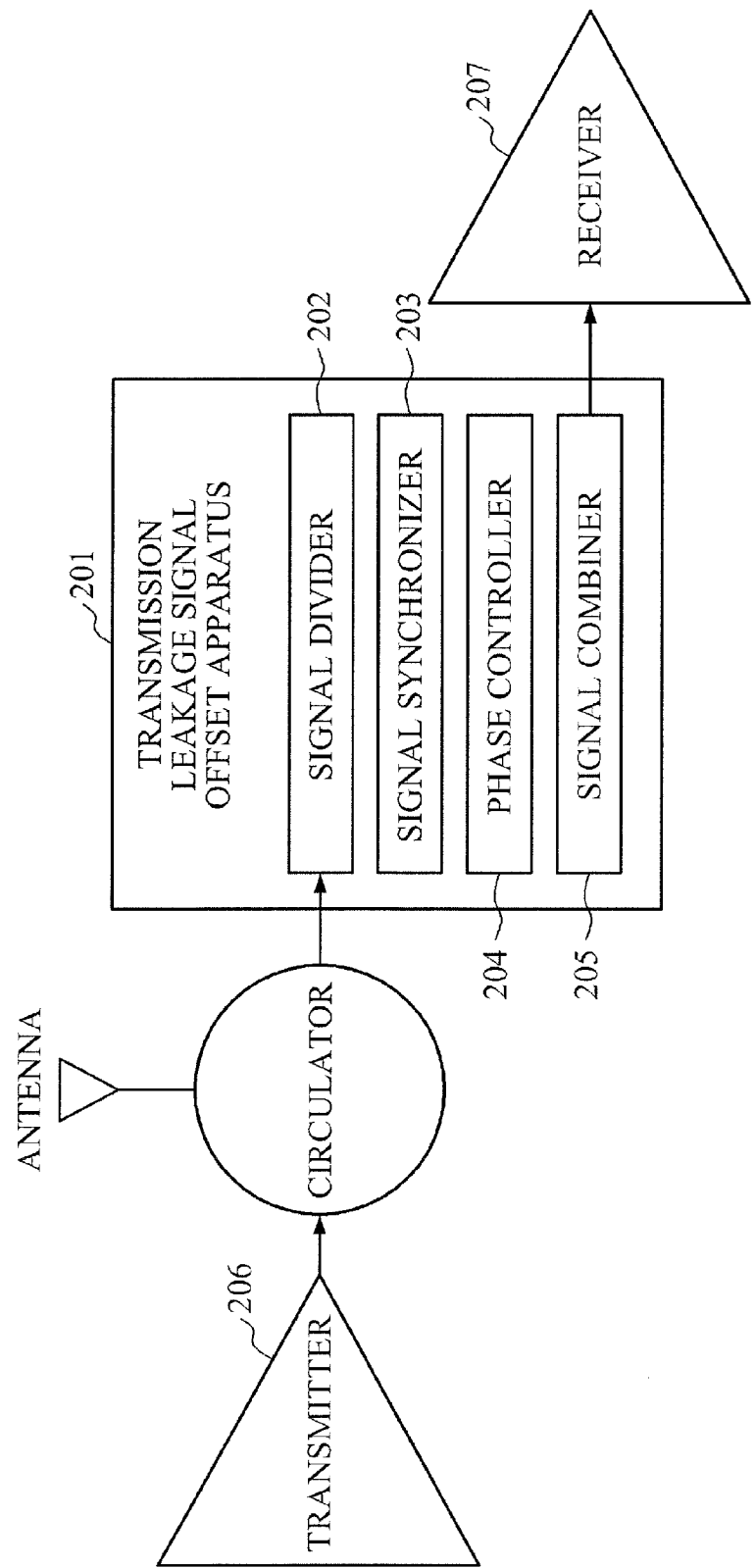
FIG. 2 is a diagram illustrating a transmission leakage signal offset apparatus according to an embodiment of the present invention.

FIG. 2 is a diagram illustrating a transmission leakage signal offset apparatus 201 according to an embodiment of the present invention.

Referring to FIG. 2, the transmission leakage signal offset apparatus 201, which is adapted to offset a transmission leakage signal flown from a transmitter 206 of an RFID reader, may synchronize a phase of the transmission leakage signal using an injection lock oscillator (ILO), changes a phase of an output signal of the ILO to 180 degrees, and combines the output signal with the transmission leakage signal, thereby offsetting the transmission leakage signal.

For this purpose, the transmission leakage signal offset apparatus 201 may include a signal divider 202, a signal synchronizer 203, a phase controller 204, and a signal combiner 205.

The signal divider 202 may receive an input of the signal flown from the transmitter 206 of the RFID reader. The signal flown to the signal divider 202 may include the transmission leakage signal flown from the transmitter 206 and a tag signal received from a tag. The transmission leakage signal may be flown directly from the transmitter 206 or flown by being reflected from an external antenna of the RFID reader. The transmission leakage signal and the tag signal may be flown to the signal divider 202 in a combined form.

The signal divider 202 may receive an input of a received signal of the RFID reader, the received signal including the transmission leakage signal, divide the received signal into at least one signal, and transmit the divided signal through different paths. That is, the signal divider 202 may transmit the divided received signal of the RFID reader to the signal combiner 205 and the ILO.

The signal synchronizer 203 may synchronize a phase of the ILO with a phase of the transmission leakage signal included in the received signal. The ILO, which is a type of phase locked loop (PLL), may be a circuit that generates a stable locked oscillation signal by applying a stable locked signal to an oscillator performing free running. A frequency of a free running signal generated by the oscillator may not be fixed to a particular frequency but be changed by a surrounding noise or device noise. When the stable locked signal is input from an outside, the free running signal may be synchronized by the locked signal.

To be more specific, the signal synchronizer 203 may synchronize the phase of the output signal of the ILO with the phase of the transmission leakage signal, by using the transmission leakage signal as an input signal of the ILO. The signal synchronizer 203 synchronizes the phase of the output signal of the ILO with the phase of the transmission leakage signal although the phase of the transmission leakage signal is changed by the external antenna of the RFID reader. Therefore, the signal synchronizer 203 may efficiently perform the synchronization without dedicatedly measuring and controlling the phase of the transmission leakage signal and a phase of the input signal of the ILO. The signal synchronizer 203 may control amplitude of the output signal by controlling an output power level of the ILO based on a power level of the transmission leakage signal.

The phase controller 204 may control a phase difference between the received signal of the RFID reader, including the divided transmission leakage signal, and the output signal of the ILO. That is, the phase controller 204 may control the phase of the received signal of the RFID reader and the phase of the output signal of the ILO so that the phase difference becomes approximately 180 degrees.

For example, the phase controller 204 may control the phase of the received signal of the RFID reader to be approximately 180 degrees while the phase of the output signal of the ILO to be approximately 0 degrees.

As another example, the phase controller 204 may control the phase of the received signal of the RFID reader to be approximately 0 degrees while the phase of the output signal of the ILO to be approximately 180 degrees.

As still another example, the phase controller 204 may control the phase of the received signal of the RFID reader to be approximately 90 degrees while the phase of the output signal of the ILO to be approximately −90 degrees, so that the phase difference becomes approximately 180 degrees.

The phase controller 204 may control a phase of a combined signal of the transmission leakage signal and the tag signal and the phase of the output signal so that the phase difference is generated between the combined signal and the output signal. Accordingly, the transmission leakage signal included in the received signal may be offset using a fact that the phase of the received signal and the phase of the output signal are equal.

The signal combiner 205 may combine the received signal of the RFID reader and the output signal of the ILO, between which the phase difference is controlled. In addition, the signal combiner 205 may offset the transmission leakage signal included in the combined signal of the transmission leakage signal and the tag signal, by combining the combined signal with the output signal.

Here, the phase controller 204 and the signal combiner 205 may be operated separately or integrally. For example, the phase controller 204 and the signal combiner 205 may be operated separately or integrally according to use of a phase shifter or a balun which are used for controlling the phase difference between the received signal of the RFID reader and the output signal of the ILO.

The received signal of the RFID reader and the output signal of the ILO, between which the phase difference is controlled, may be input to a receiver 207 of the RFID reader. In the input signal, the transmission leakage signal may be offset. To summarize, the transmission leakage signal offset apparatus 201 may divide the received signal of the RFID reader, flown from the transmitter 206 and including the transmission leakage signal, synchronizes the phase of the ILO with the phase of the transmission leakage signal, controls the phase difference between the received signal of the RFID reader and the output signal to be approximately 180 degrees, and combines the received signal of the RFID reader, including the transmission leakage signal, with the output signal of the ILO.

Figure 3:
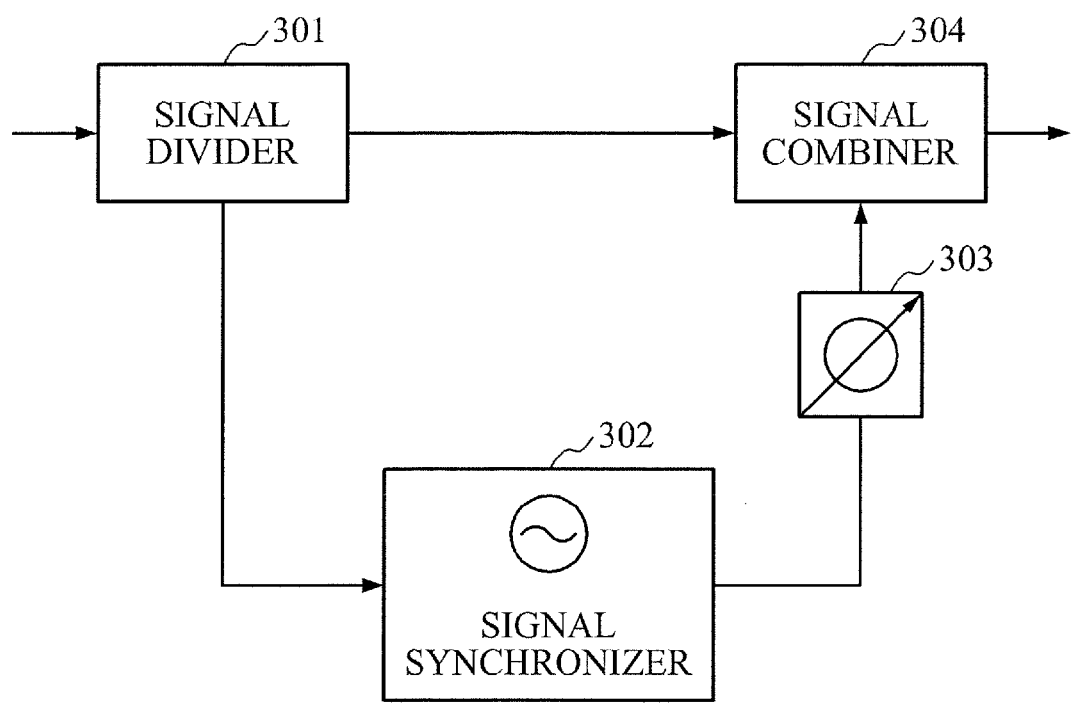
FIG. 3 is a diagram illustrating a transmission leakage signal offset apparatus using a phase shifter, according to an embodiment of the present invention.

FIG. 3 is a diagram illustrating a transmission leakage signal offset apparatus using a phase shifter, according to an embodiment of the present invention.

A signal divider 301 may divide a received signal of an RFID reader, the received signal including a transmission leakage signal, and may transmit the divided received signal to a signal combiner and an ILO. A signal synchronizer 302 may synchronize a phase of the ILO with a phase of the transmission leakage signal included in the received signal of the RFID reader.

A phase controller may control phases of the received signal of the RFID reader and an output signal of the ILO, so that a phase difference is generated between the received signal and the output signal. The phase controller may be replaced with a phase shifter 303 for generating the phase difference. That is, the phase controller may transform the phase of the output signal by approximately 180 degrees using the phase shifter 303, so that the phase of the received signal is controlled to be approximately 0 degrees and the phase of the output signal is controlled to be approximately 180 degrees.

A signal combiner 304 may combine the received signal of the RFID reader with the output signal of the ILO, passed through the phase controller. The signal combiner 304 may offset the transmission leakage signal through the combination of the received signal of the RFID reader and an output signal of the signal synchronizer, between which the phase difference is controlled.

Figure 4:
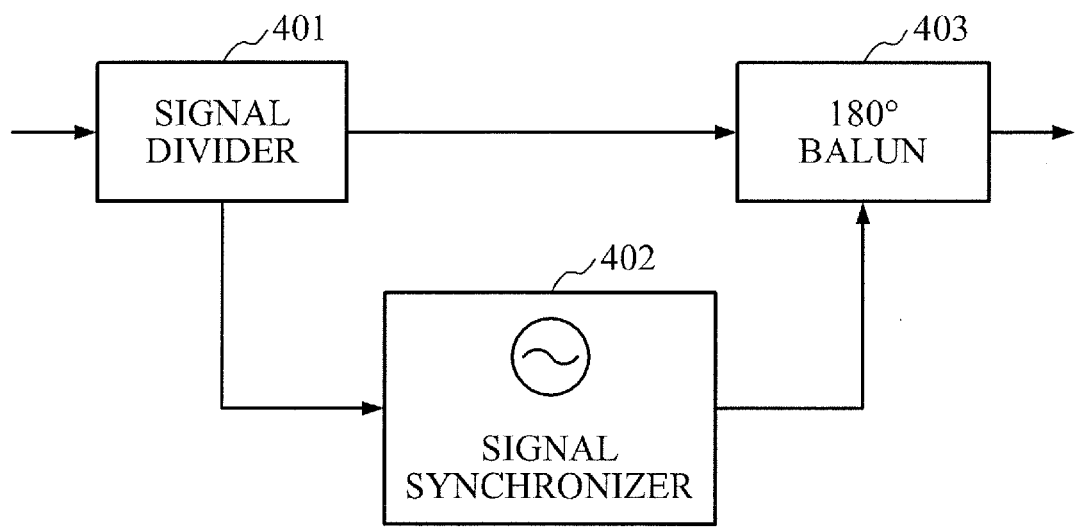
FIG. 4 is a diagram illustrating a transmission leakage signal offset apparatus using a 180 degree balun, according to an embodiment of the present invention.

FIG. 4 is a diagram illustrating a transmission leakage signal offset apparatus using a 180 degree balun 403, according to an embodiment of the present invention.

A signal divider 401 may divide a received signal of an RFID reader, including a transmission leakage signal, and may transmit the divided received signal to a signal combiner and an ILO. A signal synchronizer 402 may synchronize a phase of the ILO with a phase of the transmission leakage signal included in the received signal of the RFID reader.

A phase controller may control phases of the received signal of the RFID reader and an output signal of the ILO, so that a phase difference is generated between the received signal and the output signal. That is, the phase controller may transform the phase of the received signal of the RFID reader and the output signal of the ILO, thereby controlling the phase of the received signal to be approximately 0 degrees and the phase of the output signal to be approximately 180 degrees.

The signal combiner may combine the received signal of the RFID reader and the output signal of the ILO with each other. The signal combiner may offset the transmission leakage signal by combining the received signal of the RFID reader and the output signal of the ILO, between which the phase difference is controlled.

Here, the phase controller and the signal combiner may be replaced with the 180 degree balun 403 adapted to simultaneously perform operations of the phase controller and the signal combiner. The 180 degree balun 403 may combine the signals so that the phase difference becomes approximately 180 degrees when the phase of the received signal and the phase of the output signal are controlled equally to approximately 0 degrees.

Figure 5:
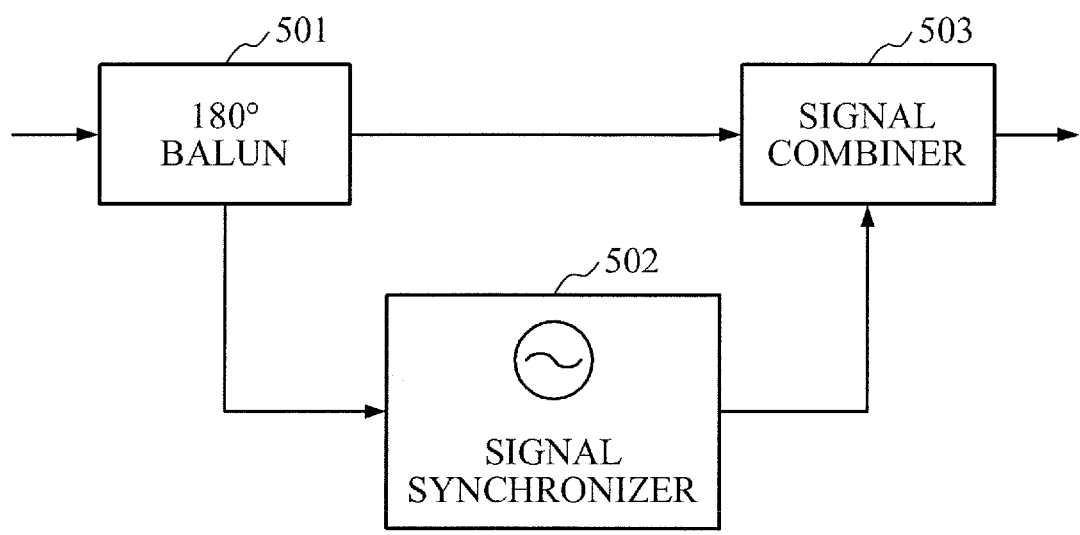
FIG. 5 is a diagram illustrating a transmission leakage signal offset apparatus using a 180 degree balun, according to another embodiment of the present invention.

FIG. 5 is a diagram illustrating a transmission leakage signal offset apparatus using a 180 degree balun, according to another embodiment of the present invention.

A signal divider may divide a received signal of an RFID reader, including a transmission leakage signal, and may transmit the divided received signal to a signal combiner 503 and an ILO. Here, after dividing the received signal of the RFID reader, the signal divider may control phases of the received signal and an output signal the ILO so that a phase difference is generated. For example, the signal divider may control the phase of the received signal to be approximately 180 degrees and the phase of the output signal to be approximately 0 degrees. In addition, the signal divider may transmit the received signal of which the phase is controlled to a signal combiner 503 and the ILO.

A signal synchronizer 502 may synchronize a phase of the ILO with a phase of the transmission leakage signal included in the received signal of the RFID reader.

The signal combiner 503 may combine the received signal of which the phase is controlled with the output signal of the ILO. The signal combiner 503 may offset the transmission leakage signal by combining the received signal of the RFID reader, including the transmission leakage signal, with the output signal of the ILO.

Here, the signal divider may replaced with a 180 degree balun 501 adapted to simultaneously perform operations of a phase controller and the signal combiner 503. The 180 degree balun 501 performs operations of the signal divider and the phase controller, by dividing the received signal of the RFID reader so that the phase difference between two divided signals becomes approximately 180 degrees.

Figure 6:
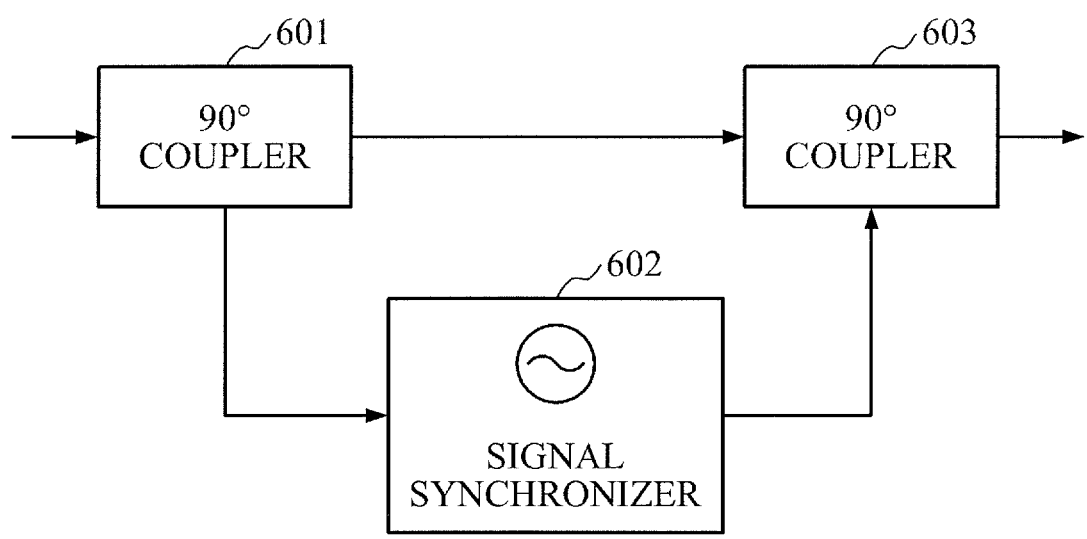
FIG. 6 is a diagram illustrating a transmission leakage signal offset apparatus using a 90 degree coupler, according to an embodiment of the present invention.

FIG. 6 is a diagram illustrating a transmission leakage signal offset apparatus using 90 degree couplers 601 and 603, according to an embodiment of the present invention.

A signal divider may divide a received signal of an RFID reader, the received signal including a transmission leakage signal, and may transmit the divided received signal to a signal combiner and an ILO. Here, after dividing the received signal of the RFID reader, the signal divider may control phases of the received signal and an output signal the ILO so that a phase difference between the received signal and the output signal becomes approximately 90 degrees using the 90 degree coupler 601.

A signal synchronizer may synchronize the phase of the output signal of the ILO with a phase of the transmission leakage signal included in the received signal of the RFID reader.

The signal combiner may combine the received signal and the output signal, between which the phase difference is approximately 90 degrees, using the 90 degree coupler 603.

Here, since the two signals having the phase difference of approximately 90 degrees are combined by adding a phase difference of approximately 90 degrees by a 90 degree coupler of the signal combiner, the phase difference between the received signal of the RFID reader and the output signal of the ILO becomes approximately 180 degrees. Accordingly, the transmission leakage signal may be offset.

Figure 7:
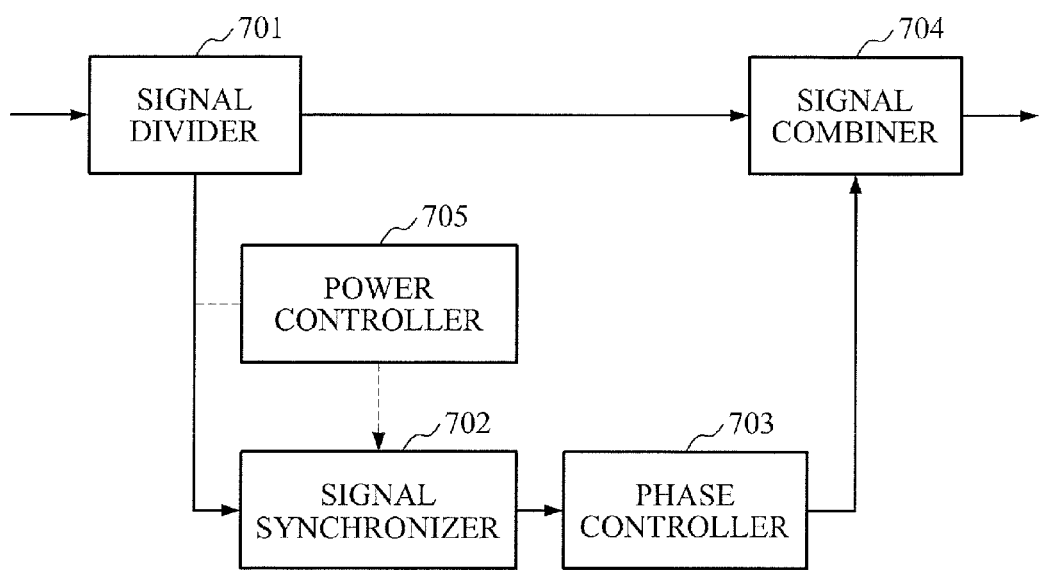
FIG. 7 is a diagram illustrating a transmission leakage signal offset apparatus based on a power level of a transmission leakage signal, according to an embodiment of the present invention.

FIG. 7 is a diagram illustrating a transmission leakage signal offset apparatus based on a power level of a transmission leakage signal, according to an embodiment of the present invention.

A transmission leakage signal offset apparatus may transmit the transmission leakage signal flown from a transmitter of an RFID reader and a received signal received from a tag, to a receiver of the RFID reader. For this, the transmission leakage signal offset apparatus may control amplitude and a power level of an output signal of the transmission leakage signal to be equal to amplitude and the power level of the transmission leakage signal flown from the transmitter of the RFID reader.

A signal divider 701 may divide a received signal of the RFID reader. That is, the signal divider 701 may divide the received signal into a signal of which a phase is to be transformed and a signal of which a phase is not to be transformed, according to whether a phase of the received signal flown to the signal divider 701 is transformed. The signal of which a phase is to be transformed may refer to the transmission leakage signal.

The transmission leakage signal offset apparatus may detect amplitude of a power signal of the transmission leakage signal using the power controller 705. For example, the power controller 705 may adjust an output power level by controlling a supplied power of an ILO according to the amplitude of the power signal of the transmission leakage signal by controlling a bias voltage or current of the ILO. Alternatively, the power controller 705 may control the output of the ILO using a gain amplifier that amplifies the power signal according to the amplitude of the power signal of the transmission leakage signal or an attenuator that reduces the power signal.

Accordingly, a signal synchronizer 702 may control the output power level of the ILO according to the power level controlled by the power detector and the power controller 705, and synchronize the phases of the transmission leakage signal and the output signal of the ILO.

The phase controller 703 may control the phase difference between the received signal of the RFID reader and the output signal of the ILO to be approximately 180 degrees.

The signal combiner 704 may offset the transmission leakage signal by combining the received signal and the output signal.

The transmission leakage signal offset apparatus may simplify a structure for measuring the amplitude and the phase of the transmission leakage signal, by controlling the power level of the ILO according to the power signal amplitude of the transmission leakage signal using the power detector and the power controller 705.

Figure 8:
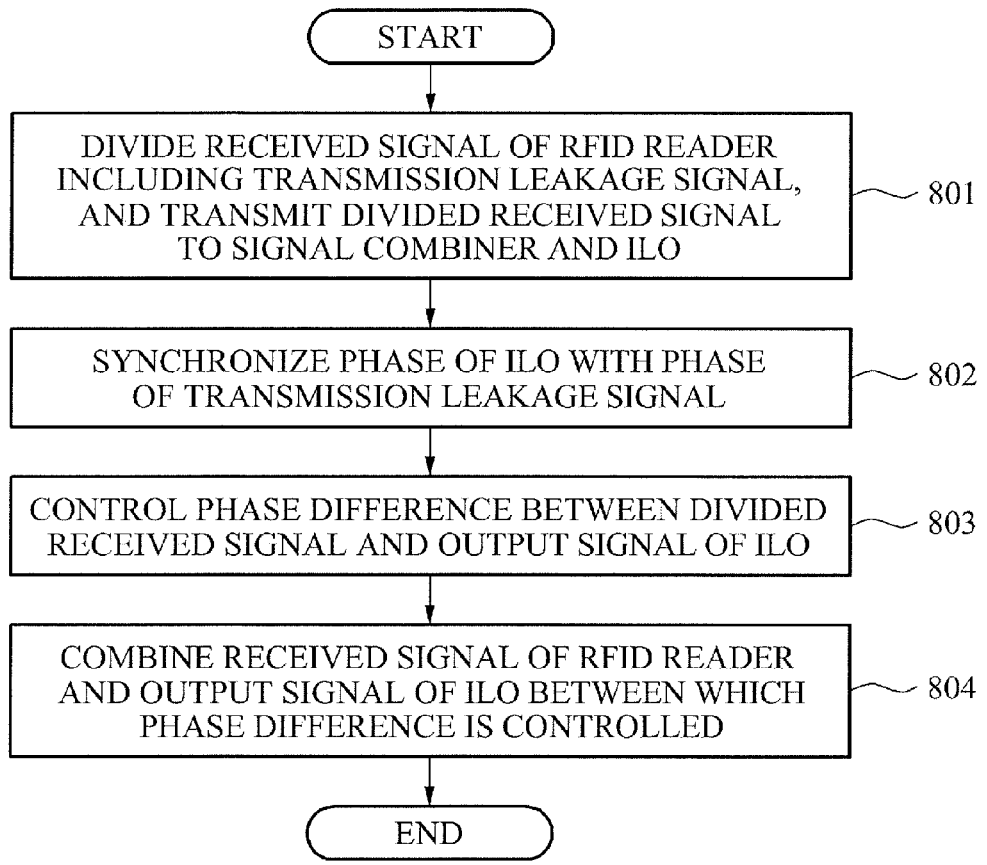
FIG. 8 is a flowchart illustrating a transmission leakage signal offset method according to an embodiment of the present invention.

FIG. 8 is a flowchart illustrating a transmission leakage signal offset method according to an embodiment of the present invention.

In operation 801, a transmission leakage signal offset apparatus may receive a received signal of an RFID reader, the received signal including a transmission leakage signal, divide the received signal into at least one received signal, and transmit the divided received signal to a signal combiner and an ILO.

After dividing the received signal, the transmission leakage signal offset apparatus may control a phase of the received signal to be approximately 180 degrees and a phase of an output signal the ILO to be approximately 0 degrees.

A transmission leakage signal offset apparatus according to another embodiment may transform a phase of an input signal of the ILO by approximately 90 degrees and a phase of the output signal of the ILO by approximately 90 degrees, after dividing the received signal of the RFID reader, so that a phase difference between the input signal and the output signal becomes approximately 180 degrees.

In addition, the transmission leakage signal offset apparatus may control the phase difference using a 180 degree balun or a 90 degree coupler.

In operation 802, the transmission leakage signal offset apparatus may synchronize the phase of the ILO with the phase of the transmission leakage signal included in the received signal. The transmission leakage signal offset apparatus may perform the synchronization by using the transmission leakage signal as the input signal of the ILO.

In operation 803, the transmission leakage signal offset apparatus may control the phase difference between the received signal of the RFID reader and the output signal of the ILO. For example, the transmission leakage signal offset apparatus may control the phases of the received signal and the output signal so that the phase difference becomes approximately 180 degrees.

In operation 804, the transmission leakage signal offset apparatus may combine the received signal of the RFID reader and the output signal of the ILO with each other, between which the phase difference is controlled. The transmission leakage signal offset apparatus may offset the transmission leakage signal included in the received signal of the RFID reader, by combining the received signal of the RFID reader with the output signal of the ILO.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A transmission leakage signal offset apparatus of a radio frequency identification (RFID) reader, the transmission leakage signal offset apparatus comprising:
   a signal divider to divide a received signal of the RFID reader, the received signal including a transmission leakage signal, and to transmit the divided received signal to a signal combiner and an injection locked oscillator (ILO);
   a signal synchronizer to synchronize a phase of the ILO with a phase of the transmission leakage signal;
   a phase controller to control a phase difference between the received signal of the RFID reader and an output signal of the ILO; and a signal combiner to combine the received signal of the RFID reader and the output signal of the ILO, between which the phase difference is controlled.

2. The transmission leakage signal offset apparatus of claim 1, wherein the signal divider divides the received signal of the RFID reader based on whether a phase shift is present with respect to the received signal of the RFID signal including the transmission leakage signal.

3. The transmission leakage signal offset apparatus of claim 1, wherein the phase controller controls a phase of the divided received signal of the RFID reader and a phase of the output signal of the ILO so that the phase difference the divided received signal and the output signal becomes approximately 180 degrees.

4. The transmission leakage signal offset apparatus of claim 1, wherein the phase controller controls a phase of the divided received signal of the RFID reader to be approximately 180 degrees and a phase of the output signal of the ILO to be approximately 0 degrees.

5. The transmission leakage signal offset apparatus of claim 1, wherein the phase controller controls a phase of the divided received signal of the RFID reader to be approximately 0 degrees and a phase of the output signal of the ILO to be approximately 180 degrees.

6. The transmission leakage signal offset apparatus of claim 1, wherein the phase controller controls a phase of the divided received signal of the RFID reader by approximately 90 degrees and a phase of the output signal of the ILO by approximately 90 degrees so that a phase difference between the divided received signal and the output signal becomes approximately 180 degrees.

7. The transmission leakage signal offset apparatus of claim 1, further comprising a power controller to control amplitude of the output signal of the ILO by controlling an output power level of the ILO according to a power level of the transmission leakage signal.

8. The transmission leakage signal offset apparatus of claim 7, wherein the power controller controls amplitude of the output signal of the ILO to be equal to amplitude of the transmission leakage signal.

9. The transmission leakage signal offset apparatus of claim 1, wherein the received signal of the RFID reader, including the transmission leakage signal, comprises a combined signal of the transmission leakage signal flown from a transmitter of the RFID reader and a tag signal received from a tag.

10. The transmission leakage signal offset apparatus of claim 1, wherein the signal divider receives and divides the received signal of the RFID reader including the transmission leakage signal with respect to a signal acquired by combining the received signal of the RFID reader and the output signal of the ILO.

11. A transmission leakage signal offset method of a radio frequency identification (RFID) reader, the transmission leakage signal offset method comprising:
dividing a received signal of the RFID reader, the received signal including a transmission leakage signal, and transmitting the divided received signal to a signal combiner and an injection locked oscillator (ILO);
synchronizing a phase of the ILO with a phase of the transmission leakage signal;
controlling a phase difference between the received signal of the RFID reader and an output signal of the ILO; and
combining the received signal of the RFID reader and the output signal of the ILO, between which the phase difference is controlled.

12. The transmission leakage signal offset method of claim 11, wherein the dividing comprises dividing the received signal of the RFID reader based on whether a phase shift is present with respect to the received signal of the RFID signal including the transmission leakage signal.

13. The transmission leakage signal offset method of claim 11, wherein the controlling comprises controlling a phase of the divided received signal of the RFID reader and a phase of the output signal of the ILO so that the phase difference the divided received signal and the output signal becomes approximately 180 degrees.

14. The transmission leakage signal offset method of claim 11, wherein the controlling comprises controlling a phase of the divided received signal of the RFID reader to be approximately 180 degrees and a phase of the output signal of the ILO to be approximately 0 degrees.

15. The transmission leakage signal offset method of claim 11, wherein the controlling comprises controlling a phase of the divided received signal of the RFID reader to be approximately 0 degrees and a phase of the output signal of the ILO to be approximately 180 degrees.

16. The transmission leakage signal offset method of claim 11, wherein the controlling comprises controlling a phase of the divided received signal of the RFID reader by approximately 90 degrees and a phase of the output signal of the ILO by approximately 90 degrees so that a phase difference between the divided received signal and the output signal becomes approximately 180 degrees.

17. The transmission leakage signal offset method of claim 11, further comprising controlling amplitude of the output signal of the ILO by controlling an output power level of the ILO according to a power level of the transmission leakage signal.

18. The transmission leakage signal offset method of claim 17, wherein the controlling comprises controlling amplitude of the output signal of the ILO to be equal to amplitude of the transmission leakage signal.

19. The transmission leakage signal offset method of claim 11, wherein the received signal of the RFID reader, including the transmission leakage signal, comprises a combined signal of the transmission leakage signal flown from a transmitter of the RFID reader and a tag signal received from a tag.

20. The transmission leakage signal offset method of claim 11, wherein the dividing comprises receiving and dividing the received signal of the RFID reader including the transmission leakage signal with respect to a signal acquired by combining the received signal of the RFID reader and the output signal of the ILO.

* * * * *